United States Patent
Lee

(10) Patent No.: US 7,298,420 B2
(45) Date of Patent: Nov. 20, 2007

(54) DIGITAL TV RECEIVER

(75) Inventor: Tae Won Lee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 551 days.

(21) Appl. No.: 10/772,038

(22) Filed: Feb. 3, 2004

(65) Prior Publication Data

US 2004/0156451 A1 Aug. 12, 2004

(30) Foreign Application Priority Data

Feb. 4, 2003 (KR) .................... 10-2003-0006733

(51) Int. Cl.
*H04N 5/21* (2006.01)
*H03D 1/24* (2006.01)
(52) U.S. Cl. .................. 348/614; 348/607; 375/326; 375/348
(58) Field of Classification Search ........... 348/607, 348/614, 470; 375/326, 346–348, 349
See application file for complete search history.

(56) References Cited

U.S. PATENT DOCUMENTS

| 5,877,816 A * | 3/1999 | Kim ........................... 348/526 |
| 6,226,049 B1 * | 5/2001 | Oh ............................ 348/607 |
| 6,292,518 B1 * | 9/2001 | Grabb et al. ................ 375/321 |

* cited by examiner

*Primary Examiner*—Victor R. Kostak
(74) *Attorney, Agent, or Firm*—Lee, Hong, Degerman, Kang & Schmadeka

(57) ABSTRACT

Disclosed is a digital TV receiver, in which a symbol synchronization signal and a carrier signal are compensated by detecting multipath channel information. The present invention compensates a carrier and symbol synchronization signal attenuated due to multipath by detecting a degree of attenuation affected by a multipath signal from a pilot signal and symbol timing information, and uses a degree of attenuation affected by a multipath signal detected from a pilot signal and symbol timing information as multipath information to apply to a smart antenna control. Therefore, the present invention enables to enhance receiving performance of the digital TV receiver.

15 Claims, 5 Drawing Sheets of the page

DIGITAL TV RECEIVER

This application claims the benefit of the Korean Application No. P2003-6733 filed on Feb. 4, 2003, which is hereby incorporated by reference.

BACKGROUND OF THE INVENTION

1. Field of the Invention

The present invention relates to a digital TV, and more particularly, to a digital TV receiver compensating a symbol synchronization signal and a carrier signal by detecting multipath channel information.

2. Discussion of the Related Art

VSB (vestigial sideband) systems have been adopted as the standard of a terrestrial channel transmission method for digital television (DTV). Less efforts were made to research and develop antennas for a digital TV receiver. Recently, new concepts and ideas for the antennas are actively proposed.

It has been known that standardization (CEA/EIA909) of the digital TV receiver antenna was completed by ATSC (advanced television system committee). Besides, it has been verified that ATI (Next Wave) corporation has experimentally applied the antenna to digital TV, and its field test is still in progress.

Meanwhile, since the digital TV market itself is still at the early stage of development, many efforts were made to the development of digital TV receiver antenna technologies for the applications to radio communication systems such as mobile terminal, military radio communication, etc. Such antenna technologies are very complicated and highly expensive, whereby many technological efforts are needed.

A smart antenna applied to digital TV removes multipath for indoor reception and improves quality of signal, thereby enabling to enhance reception performance. Especially, such a smart antenna brings a remarkable effect under the environment that a separately-located transmitting tower exists according to broadcast channel. In this case, the conventional method of detecting multipath information observes spectrum flatness of a reception signal or uses a tap coefficient or tip energy of a channel equalizer.

However, such methods mostly detect information from the channel equalizer, in which precise convergence of the channel equalizer should be presumed to detect the correct information. Hence, information detecting time is elongated. Moreover, in case that the channel equalizer is unstable, incorrect information or non-information is detected.

FIG. 1 is a graph of frequency spectrum of a general VSB signal, in which carrier information (pilot) and symbol timing information are located at a DC position and a symbol frequency, respectively. Hence, the channel equalizer compensates such distortions to improve reception performance. Yet, if a specific multipath signal is generated to attenuate carrier information and symbol synchronization information, the carrier and symbol synchronization recovery units at a front side of the channel equalizer are degraded in performance or fail to operate so that channel equalization cannot be performed. This is fatal to the receiving performance of the VSB systems.

SUMMARY OF THE INVENTION

Accordingly, the present invention is directed to a digital TV receiver that substantially obviates one or more problems due to limitations and disadvantages of the related art.

An object of the present invention is to provide a digital TV receiver, by which a carrier and symbol synchronization signal attenuated due to multipath are compensated by detecting a degree of attenuation affected by a multipath signal from a pilot signal and symbol timing information.

Another object of the present invention is to provide a digital TV receiver, in which a degree of attenuation affected by a multipath signal detected from a pilot signal and symbol timing information is used as multipath information to apply to a smart antenna control.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in a digital TV receiving to display a digital broadcast signal, a digital TV receiver according to the present invention includes a complex multiplier multiplying the received broadcast signal by a reference carrier signal to convert to a baseband signal, an interpolator re-sampling the baseband signal into a frequency of a doubled symbol clock to interpolate, and a carrier recovery unit generating a compensation value by detecting multipath channel information from the reference carrier signal and the received broadcast signal, the carrier recovery unit compensating a carrier signal level of the received broadcast signal with the compensation value, the carrier recovery unit generating the reference carrier signal by finding a phase error from the compensated carrier signal.

In this case, the carrier recovery unit includes a low band pass filter detecting a carrier signal of the received broadcast signal from an output of the interpolator, a multipath information detecting unit finding the compensation value by accumulating a difference between a level of the carrier signal and a level of the reference carrier signal, the multipath information detecting unit compensating the carrier signal level of the received broadcast signal with the compensation value, and a phase error detection and oscillation unit finding a phase error from the compensated carrier signal, the phase error detection and oscillation unit generating the reference carrier signal proportional to the phase error to output to the complex multiplier.

In another aspect of the present invention, in a digital TV receiving to display a digital broadcast signal, a digital TV receiver includes a complex multiplier multiplying the received broadcast signal by a reference carrier signal to convert to a baseband signal, an interpolator re-sampling the baseband signal into a frequency of a doubled symbol clock to interpolate, and a symbol synchronization recovery unit extracting symbol synchronization information located at a symbol frequency from an output signal of the interpolator, the symbol synchronization recovery unit detecting multipath channel information using the symbol synchronization information, the symbol synchronization recovery unit performing symbol synchronization recovery by compensating a symbol synchronization signal attenuated by multipath.

In this case, the symbol synchronization recovery unit includes a pre-filter detecting symbol synchronization information by passing an edge portion of a spectrum outputted from the interpolator, a multipath information detecting unit finding a compensation value by accumulating a difference between a symbol synchronization signal level inputted via the pre-filter and a reference symbol synchronization signal level, the multipath information detecting unit compensating the inputted symbol synchronization signal level through the compensation value, and a timing error detection and oscillation unit finding a timing error from the compensated symbol synchronization signal, the timing error detection and oscillation unit generating a doubled symbol clock frequency proportional to the timing error to output to the interpolator.

In another aspect of the present invention, a digital TV receiver includes a complex multiplier multiplying a received broadcast signal by a reference carrier signal to convert to a baseband signal, an interpolator re-sampling the baseband signal into a frequency of a doubled symbol clock to interpolate, a carrier recovery unit generating a compensation value by detecting multipath channel information from the reference carrier signal and the received broadcast signal, the carrier recovery unit compensating a carrier signal level of the received broadcast signal with the compensation value, the carrier recovery unit generating the reference carrier signal by finding a phase error from the compensated carrier signal, and a symbol synchronization recovery unit extracting symbol synchronization information located at a symbol frequency from an output signal of the interpolator, the symbol synchronization recovery unit detecting multipath channel information using the symbol synchronization information, the symbol synchronization recovery unit performing symbol synchronization recovery by compensating a symbol synchronization signal attenuated by multipath.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

The present invention is characterized in that a carrier and symbol synchronization signal attenuated due to multipath are compensated by detecting a degree of attenuation affected by a multipath signal from a pilot signal and symbol timing information.

Figure 2:
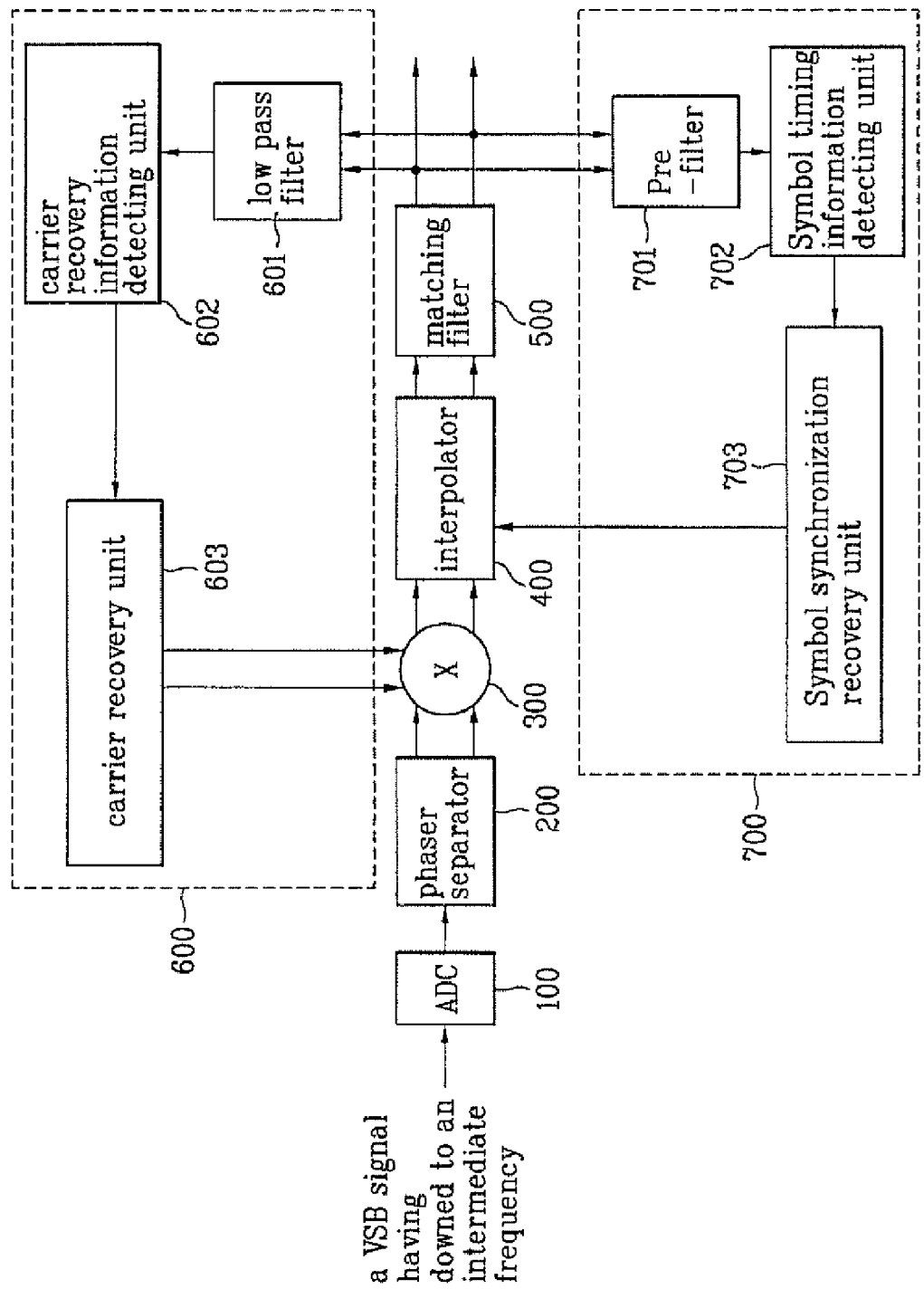
FIG. 2 is a block diagram of a digital TV receiver according to the present invention.

FIG. 2 is a block diagram of a digital TV receiver according to the present invention.

Referring to FIG. 2, a digital TV receiver according to the present invention includes an A/D converting unit 100 digitalizing a VSB signal having downed to an intermediate frequency, a phase separator 200 separating the digital signal into a real pass band signal and an imaginary pass band signal having a −90° phase difference, a complex multiplier 300 converting the real and imaginary pass band signals to real and imaginary baseband signals by multiplying the real and imaginary pass band signals by a reference carrier signal resulting from carrier recovery, respectively, an interpolator 400 interpolating the real and imaginary baseband signals outputted from the complex multiplier 300 into a digital signal synchronized with a doubled symbol clock frequency using an output frequency of a symbol clock recovery unit, a matching filter 500 filtering an output of the interpolator 400 to maximize SNR at a symbol position, a carrier recovery unit 600 performing the carrier recovery by compensating a carrier, which was attenuated by multipath, by extracting a pilot signal only from an output of the matching filter 500 and then by detecting multipath channel information using the pilot signal, and a symbol synchronization recovery unit 700 performing symbol synchronization recovery by compensating a symbol synchronization signal, which was attenuated by the multipath, by extracting symbol timing information located at a symbol frequency from the output of the matching filter 500 and then by detecting the multipath channel information using the symbol timing information.

An operation of the above-described digital TV receiver according to the present invention is explained as follows.

First of all, the A/D converting unit 100 digitalizes the VSB signal having downed to the intermediate frequency and outputs the corresponding digital signal to the phase separator 200. The phase separator 200 then separates the digital signal into the real and imaginary pass band signals having a −90° phase difference from each other to output to the complex multiplier 300.

The complex multiplier 300 multiplies the real and imaginary pass band signals by the carrier-recovered reference carrier signal so that the real and imaginary pass band signals are converted to the real and imaginary baseband signals, respectively, and then outputs the converted signals to the interpolator 400.

The interpolator 400 interpolates the basebanded digital signal outputted from the complex multiplier 300 into the digital signal synchronized with the doubled symbol clock frequency outputted from the symbol synchronization recovery unit 700 and then outputs the synchronized digital signal to the matching filter 500.

The matching filter 500 is a digital matching filter having a roll-off rate equal to that of a root-square matching filter used in a transmitting side. After a symbol-synchronized signal outputted from the interpolator 400 has passed the matching filter 500, SNR at the symbol position is maximized.

And, the signal outputted from the matching filter 500 is outputted to the carrier recovery unit 700 for the carrier recover as well as the symbol synchronization recovery unit 700 for the symbol synchronization recovery, simultaneously.

Figure 3:
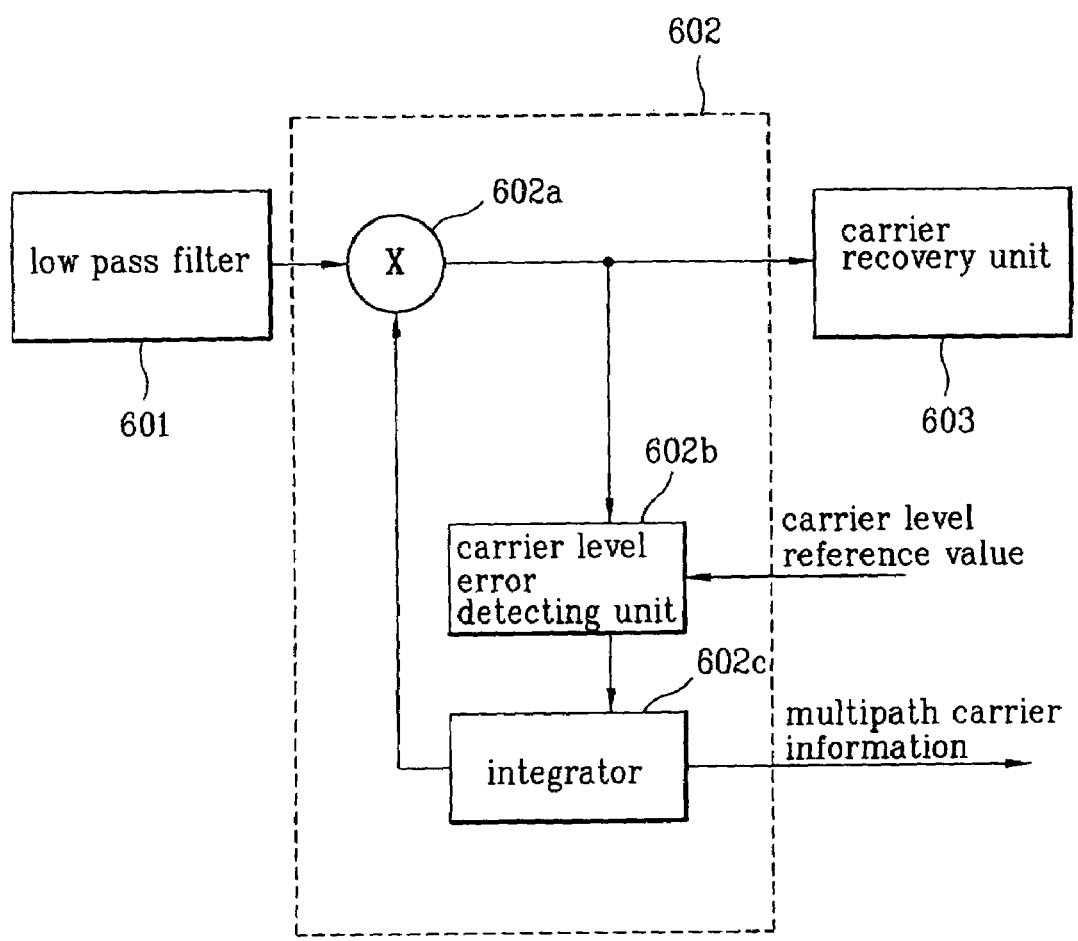
FIG. 3 is a detailed block diagram of a carrier recovery unit in FIG. 2.

FIG. 3 is a detailed block diagram of a carrier recovery unit in FIG. 2.

Referring to FIG. 3, the carrier recovery unit 600 includes a low band pass filter 601 detecting carrier information from the output of the matching filter 500, a multipath information detecting unit 602 finding a compensation value by accumulating a difference between a carrier level inputted via the low band pass filter 601 and a carrier level reference value (i.e., carrier level in case that there exists no multipath) and compensating the carrier level by multiplying the compensation value by the carrier information outputted from the low band pass filter 601, and a phase error detection and oscillation unit 603 finding a phase error from the carrier information outputted from the multipath information detecting unit 602 and generating a reference carrier signal proportional to the phase error to output to the complex multiplier 300.

Moreover, the multipath information detecting unit 602 includes a multiplier 602a compensating the carrier level by multiplying the carrier information outputted from the low band pas filter 601 by the fed-back compensation value, a carrier level error detecting unit 602b finding the difference between the carrier level outputted from the multiplier 602a and the carrier level reference value, and an integrator 602c accumulating the difference found by the carrier level error detecting unit 602b to output the accumulated difference as the compensation value to the multiplier 602a.

An operation of the above-describer carrier recovery unit 600 is explained as follows.

First of all, the low band pass filter 601 filters the carrier information only from the output of the matching filter 500. Namely, the phase error detection and oscillation unit 603 just needs a signal around a frequency where a pilot frequency exists in 6 MHz bandwidth.

Figure 1:
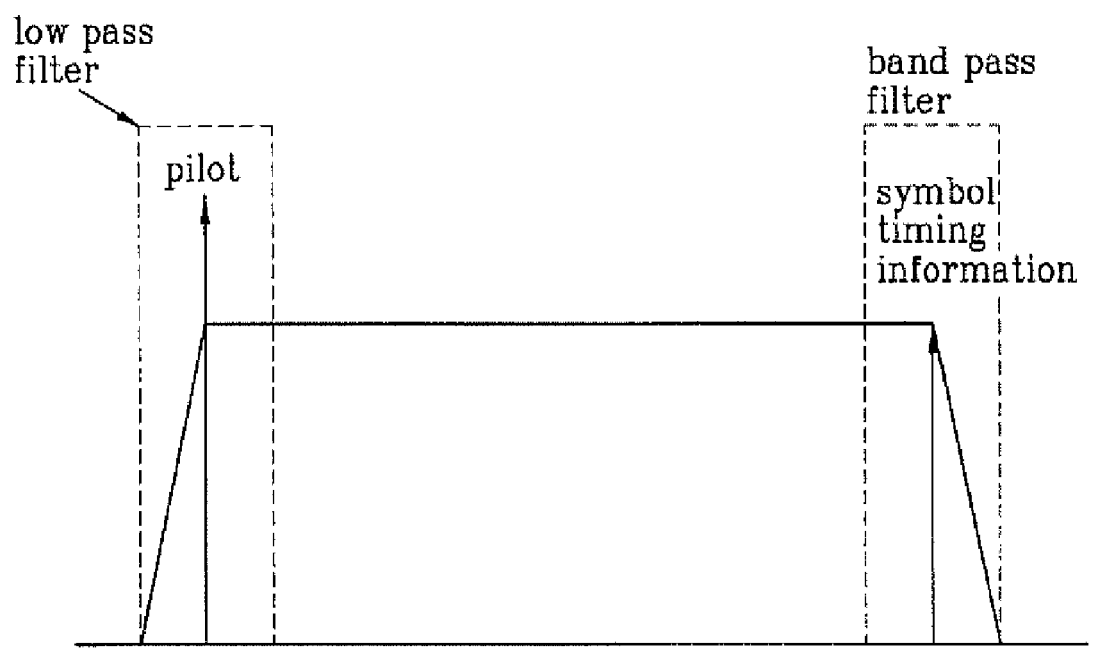
FIG. 1 is a graph of frequency spectrum of a general VSB signal.

Hence, the low band pass filter 601 removes the rest frequency components where data components exist from the output of the matching filter 500, thereby preventing performance of the carrier recovery unit 600 from being degraded by data. Namely, the pilot signal, as shown in FIG. 1, is changed into a DC component in the real and imaginary baseband signals. So, the carrier recovery is possible if there exist components around DC. Therefore, the rest data components except the signal around the DC component are removed by the low band pass filter 601.

An output of the low pass band filter 601 is outputted to the multiplier 602a of the multipath information detecting unit 602. The multiplier 601 compensates the carrier attenuated by the multipath signal, i.e., the carrier level, by multiplying the carrier information outputted from the low band pass filter 601 by the fed-back compensation value, and then outputs the compensated information or level to both of the carrier level error detecting unit 602b and the phase error detection and oscillation unit 603, simultaneously.

The carrier level error detecting unit 602b calculates the difference between the carrier level outputted from the multiplier 602a and the carrier level reference value (i.e., the carrier level in case that no multipath exists) and then outputs the difference to the integrator 602c. The integrator 602c accumulates the difference and then outputs the accumulated value as the compensation value to the multiplier 602a to compensate the carrier level. In this case, the compensation value outputted from the integrator 602c is used as the multipath carrier information later.

Finally, the phase error detection and oscillation unit 603 detects a remaining error of the carrier from the carrier information outputted from the multiplier 602a, and generates a new reference carrier signal according to the remaining error of the carrier to output to the complex multiplier 300.

Figure 4:
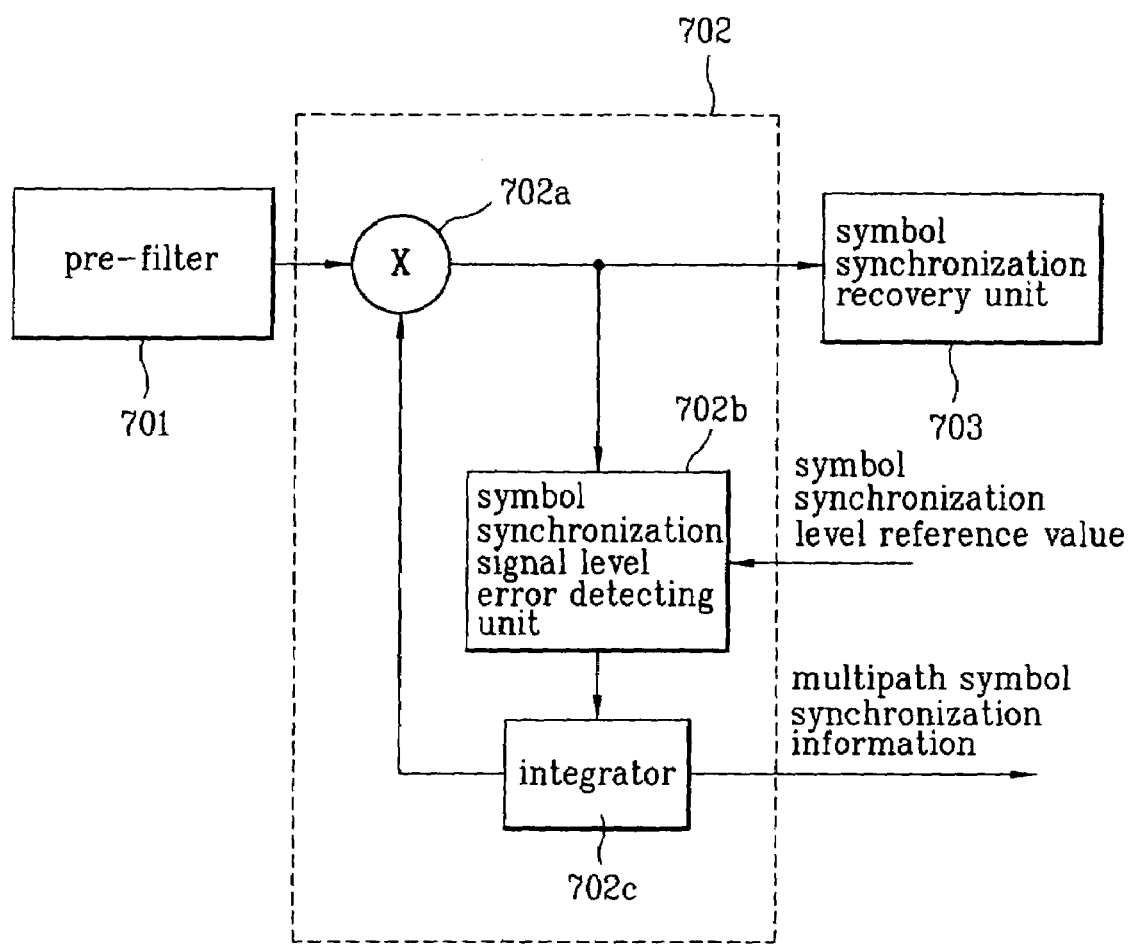
FIG. 4 is a detailed block diagram of a symbol synchronization recovery unit in FIG. 2.

FIG. 4 is a detailed block diagram of a symbol synchronization recovery unit in FIG. 2.

Referring to FIG. 4, the symbol synchronization recovery unit 700 includes a pre-filter 701 detecting symbol synchronization information by passing an edge portion of an output spectrum of the matching filter 500 only, a multipath information detecting unit 702 compensating a symbol synchronization signal level by finding a compensation value by accumulating a difference between the symbol synchronization signal level inputted via the pre-filter 701 and a symbol synchronization signal level reference value (i.e., symbol synchronization signal level in case that there exists no multipath) and then by multiplying the compensation value by the symbol synchronization information outputted from the pre-filter 701, and a timing error detection and oscillation unit 703 finding a timing error from the symbol synchronization information outputted from the multipath detecting unit 702 and generating a doubled symbol clock frequency, which is newly compensated, from the timing error information to output to the interpolator 400.

The above-constructed symbol synchronization recovery unit 700 is explained as follows.

First of all, the multipath information detecting unit 702 includes a multiplier 702a compensating the symbol synchronization signal level by multiplying the symbol synchronization information by the fed-back compensation value, a symbol synchronization level error detecting unit 702b finding the difference between the symbol synchronization signal level outputted from the multiplier 702a and the symbol synchronization signal level reference value, and an integrator 702c accumulating the difference of the symbol synchronization level error detecting unit 702b to output the accumulated difference as the compensation value to the multiplier 702a.

The pre-filter 701 of the symbol synchronization recovery unit 700 filters the symbol synchronization information only from the output of the matching filter 500. Namely, the symbol timing information lies on a symbol frequency. As the position of the symbol frequency is the edge portion, as shown in FIG. 1, of the frequency spectrum of the VSB signal, the pre-filter 701 passes the edge portion of the output spectrum of the matching filter 500 to detect the symbol synchronization information.

An output of the pre-filter is outputted to the multiplier 702a of the multipath information detecting unit 702. The multiplier 702a compensates the symbol synchronization information attenuated by the multipath signal, i.e., the symbol synchronization signal level, by multiplying the symbol synchronization information outputted from the pre-filter 701 by the fed-back compensation value and then outputs the compensated symbol synchronization information to both of the symbol synchronization level error detecting unit 702b and the timing error detection and oscillation unit 703, simultaneously.

The symbol synchronization error detecting unit 702b finds the difference between the level of the symbol synchronization signal outputted from the multiplier 702a and the symbol synchronization signal level reference value (i.e., the symbol synchronization signal level in case that there exists no multipath) and outputs the difference to the integrator 702c. The integrator 702c accumulates the difference and outputs the accumulated value as the compensation value to the multiplier 702a to compensate the symbol synchronization signal level. In this case, the compensation value outputted from the integrator 702c is used as the multipath symbol synchronization information later.

The timing error detection and oscillation unit 703 detects the timing error information from the symbol synchronization information outputted from the multiplier 702a, and generates the frequency of the doubled symbol clock, which is newly compensated, from the timing error information to output to the interpolator 400.

Meanwhile, the compensation values found by the integrators 602c and 702c of the carrier and symbol synchronization recovery units 600 and 700 are used as the multipath carrier information and the multipath symbol synchronization information, respectively to be outputted to an antenna control system.

Figure 5:
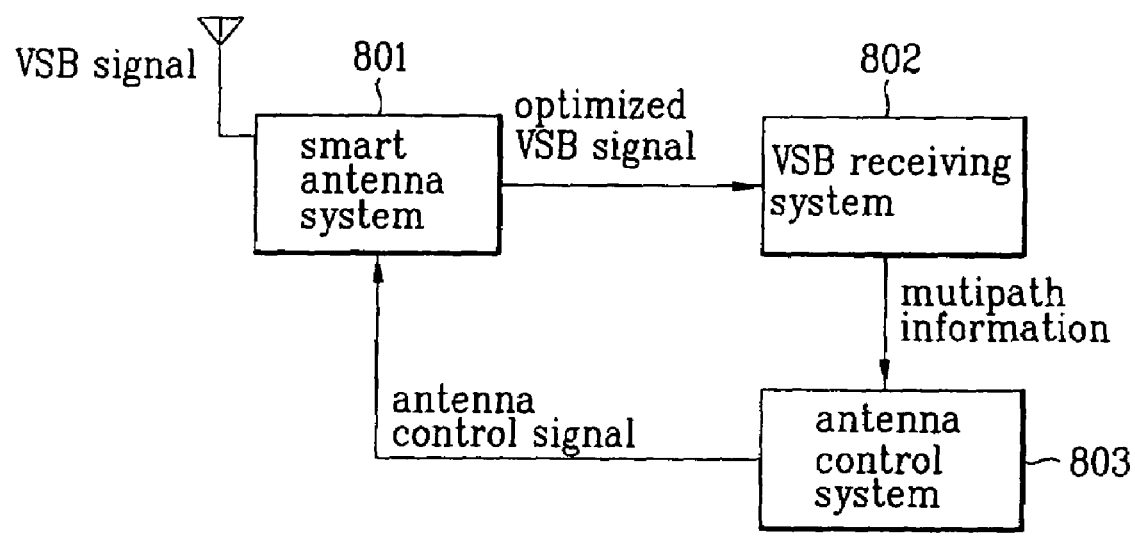
FIG. 5 is a block diagram of an antenna system to which multipath carrier information and symbol synchronization information are applied according to the present invention.

FIG. 5 is a block diagram of an antenna system to which multipath carrier information and symbol synchronization information are applied according to the present invention.

Referring to FIG. 5, an antenna control system 803 receives the multipath carrier information and the multipath symbol synchronization information from a VSB reception system 802 to use the received information as channel information. Namely, a reception state of the antenna is checked according to a size of the channel information and a corresponding control signal is outputted to a smart antenna system 801 to control a direction of a smart antenna. Namely, the direction of the antenna is controlled toward a direction providing a good reception according to the channel information.

Considering the conventional method of detecting multipath information by observing spectrum flatness or using the tap coefficient or tip energy information of a channel equalizer, the application of the present invention to the digital TV of the VSB transmitting system is much simplified and very useful.

Moreover, the present invention is applicable to wire/wireless communication fields such as VSB, QAM, etc.

Accordingly, the digital TV receiver according to the present invention compensates the symbol synchronization signal and carrier attenuated by the multipath by detecting the attenuation degree affected by the multipath signal from the pilot and symbol synchronization signals, and uses the attenuation degree, which was affected by the multipath signal detected from the pilot signal and the symbol timing information, as the multipath information to enhance the receiving performance of the digital TV receiver.

Moreover, the present invention uses the compensation information as the multipath information of the antenna control system to control the antenna, thereby simplifying the antenna control logic.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A digital TV receiver, comprising:
a complex multiplier multiplying a received broadcast signal by a reference carrier signal to convert the received broadcast signal to a baseband signal;
an interpolator interpolating the baseband signal from the complex multiplier into a digital signal synchronized with a doubled symbol clock frequency; and
a carrier recovery unit generating a compensation value by detecting multipath channel information from the reference carrier signal and the received broadcast signal, the carrier recovery unit compensating a carrier signal level of the received broadcast signal with the compensation value and generating the reference carrier signal by finding a phase error from the compensated carrier signal,
wherein the multipath channel information is detected using only a pilot signal with data frequency components removed.

2. The digital TV receiver of claim 1, the carrier recovery unit comprising:
a low band pass filter detecting a carrier signal of the received broadcast signal from an output of the interpolator;
a multipath information detecting unit finding the compensation value by accumulating a difference between a level of the carrier signal and a level of the reference carrier signal, the multipath information detecting unit compensating the carrier signal level of the received broadcast signal with the compensation value; and
a phase error detection and oscillation unit finding a phase error from the compensated carrier signal, the phase error detection and oscillation unit generating the reference carrier signal proportional to the phase error to output to the complex multiplier.

3. The digital TV receiver of claim 2, wherein the level of the reference carrier signal is the carrier signal level in case that there exists no multipath.

4. A digital TV receiver, comprising:
a complex multiplier multiplying a received broadcast signal by a reference carrier signal to convert the received broadcast signal to a baseband signal;
an interpolator interpolating the baseband signal from the complex multiplier into a digital signal synchronized with a doubled symbol clock frequency; and
a symbol synchronization recovery unit extracting only symbol synchronization information located at a symbol frequency from an output signal of the interpolator, the symbol synchronization recovery unit detecting multipath channel information using the extracted symbol synchronization information and performing symbol synchronization recovery by compensating a symbol synchronization signal attenuated by multipath.

5. The digital TV receiver of claim 4, the symbol synchronization recovery unit comprising:
a pre-filter detecting symbol synchronization information by passing an edge portion of a spectrum outputted from the interpolator;
a multipath information detecting unit finding a compensation value by accumulating a difference between a symbol synchronization signal level inputted via the pre-filter and a reference symbol synchronization signal level, the multipath information detecting unit compensating the inputted symbol synchronization signal level through the compensation value; and
a timing error detection and oscillation unit finding a timing error from the compensated symbol synchronization signal, the timing error detection and oscillation unit generating a doubled symbol clock frequency proportional to the timing error to output to the interpolator.

6. The digital TV receiver of claim 5, the multipath information detecting unit comprising:
a multiplier compensating the symbol synchronization signal level by multiplying the symbol synchronization signal outputted from the pre-filter by the fed-back compensation value;
a symbol synchronization level error detecting unit finding the difference between the symbol synchronization signal level outputted from the multiplier and the reference symbol synchronization signal level; and an integrator accumulating the difference of the symbol synchronization level error detecting unit to output the accumulated difference as the compensation value to the multiplier.

7. The digital TV receiver of claim 5, wherein the reference symbol synchronization level is the symbol synchronization level in case that there exists no multipath.

8. A digital TV receiver, comprising:

a complex multiplier multiplying a received broadcast signal by a reference carrier signal to convert the received broadcast signal to a baseband signal;

an interpolator interpolating the baseband signal from the complex multiplier into a digital signal synchronized with a doubled symbol clock frequency;

a carrier recovery unit generating a compensation value by detecting multipath channel information from the reference carrier signal and the received broadcast signal, compensating a carrier signal level of the received broadcast signal with the compensation value, and generating the reference carrier signal by finding a phase error from the compensated carrier signal; and a symbol synchronization recovery unit extracting only symbol synchronization information located at a symbol frequency from an output signal of the interpolator, the symbol synchronization recovery unit detecting multipath channel information using the extracted symbol synchronization information and performing symbol synchronization recovery by compensating a symbol synchronization signal attenuated by multipath, wherein the multipath channel information is detected using only a pilot signal with data frequency components removed.

9. The digital TV receiver of claim 8, the carrier recovery unit comprising:

a low band pass filter detecting a carrier signal of the received broadcast signal from an output of the interpolator;

a multipath information detecting unit finding the compensation value by accumulating a difference between a level of the carrier signal and a level of the reference carrier signal, the multipath information detecting unit compensating the carrier signal level of the received broadcast signal with the compensation value; and a phase error detection and oscillation unit finding a phase error from the compensated carrier signal, the phase error detection and oscillation unit generating the reference carrier signal proportional to the phase error to output to the complex multiplier.

10. The digital TV receiver of claim 9, the multipath information detecting unit comprising:

a multiplier compensating the symbol synchronization signal level by multiplying the symbol synchronization signal outputted from the pre-filter by the fed-back compensation value;

a symbol synchronization level error detecting unit finding the difference between the symbol synchronization signal level outputted from the multiplier and the reference symbol synchronization signal level; and an integrator accumulating the difference of the symbol synchronization level error detecting unit to output the accumulated difference as the compensation value to the multiplier.

11. The digital TV receiver of claim 9, wherein the level of the reference carrier signal is the carrier signal level in case that there exists no multipath.

12. The digital TV receiver of claim 8, the symbol synchronization recovery unit comprising:

a pre-filter detecting symbol synchronization information by passing an edge portion of a spectrum outputted from the interpolator;

a multipath information detecting unit finding a compensation value by accumulating a difference between a symbol synchronization signal level inputted via the pre-filter and a reference symbol synchronization signal level, the multipath information detecting unit compensating the inputted symbol synchronization signal level through the compensation value; and a timing error detection and oscillation unit finding a timing error from the compensated symbol synchronization signal, the timing error detection and oscillation unit generating a doubled symbol clock frequency proportional to the timing error to output to the interpolator.

13. The digital TV receiver of claim 12, the multipath information detecting unit comprising:

a multiplier compensating the symbol synchronization signal level by multiplying the symbol synchronization signal outputted from the pre-filter by the fed-back compensation value;

a symbol synchronization level error detecting unit finding the difference between the symbol synchronization signal level outputted from the multiplier and the reference symbol synchronization signal level; and an integrator accumulating the difference of the symbol synchronization level error detecting unit to output the accumulated difference as the compensation value to the multiplier.

14. The digital TV receiver of claim 12, wherein the reference symbol synchronization level is the symbol synchronization level in case that there exists no multipath.

15. The digital TV receiver of claim 8, further comprising an antenna control system controlling a direction of an antenna using multipath carrier compensation information detected from carrier information of the carrier recovery unit and multipath carrier compensation information detected from symbol synchronization information of the symbol synchronization recovery unit.

* * * * *